US008870260B2

(12) United States Patent
Le Duc et al.

(10) Patent No.: US 8,870,260 B2
(45) Date of Patent: Oct. 28, 2014

(54) SIDE PROTECTION DEVICE FOR A MOTOR VEHICLE AND ASSOCIATED MOTOR VEHICLE

(75) Inventors: Francois Le Duc, Clamart (FR); Guillaume Le Jaouen, Montigny le Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/641,833

(22) PCT Filed: Jun. 28, 2012

(86) PCT No.: PCT/FR2012/051487
§ 371 (c)(1),
(2), (4) Date: Oct. 17, 2012

(87) PCT Pub. No.: WO2013/001239
PCT Pub. Date: Jan. 3, 2013

(65) Prior Publication Data
US 2013/0134738 A1  May 30, 2013

(30) Foreign Application Priority Data
Jun. 28, 2011  (FR) ..................... 11 55722

(51) Int. Cl.
B60J 5/04  (2006.01)
(52) U.S. Cl.
CPC .............. B60J 5/0472 (2013.01); B60J 5/0443 (2013.01); B60J 5/0484 (2013.01); B60J 5/0455 (2013.01); B60J 5/0419 (2013.01)
USPC .................................................. 296/146.11
(58) Field of Classification Search
CPC ...... B60J 5/0419; B60J 5/0443; B60J 5/0455; B60J 5/0472; B60J 5/0484; B60K 1/04; B60K 2001/0438; B60L 11/1877; B62D 21/157; B32B 15/08; B32B 15/082; B32B 17/06; B32B 27/20; B23P 13/00; B29C 47/0894; B60Q 1/04; B65D 13/02; B65D 1/40
USPC .................... 296/146.6, 146.11, 146.12, 202; 16/244; 49/209, 333, 337, 210, 216, 49/218, 226, 208, 334, 41
See application file for complete search history.

(56) References Cited

U.S. PATENT DOCUMENTS 6,676,193 B1 * 1/2004 Hanagan .................. 296/146.11
6,820,918 B1 * 11/2004 DeBono .................... 296/146.11
(Continued)

FOREIGN PATENT DOCUMENTS

DE  10 2005 059 413  6/2007
EP  0 493 225  7/1992
FR  2 770 807  5/1999

OTHER PUBLICATIONS

French Search Report Issued Nov. 9, 2011 in FR 11 55722 Filed Jun. 28, 2011 (with Translation of Category).

Primary Examiner — Glenn Dayoan
Assistant Examiner — Sunsurraye Westbrook
(74) Attorney, Agent, or Firm — Oblon, Spivak, McClelland, Maier & Neustadt, L.L.P.

(57) ABSTRACT

A side protection device for a motor vehicle with a body and an opening for at least one passenger to access the vehicle, including: a side protection element, configured to be shifted from a closed position to an open position; an internal skeleton including a structural module of plastic and a stiffener tube of metal, the structural module including a multi-ribbed first portion, configured to receive the stiffener tube, and a second open portion, configured to define a frame for a translucent panel.

16 Claims, 4 Drawing Sheets

(56) References Cited

U.S. PATENT DOCUMENTS

| | | |
|---|---|---|
| 7,040,688 B2 * | 5/2006 | White et al. ............... 296/146.6 |
| 7,347,483 B2 * | 3/2008 | De Bono .................. 296/146.12 |
| 2004/0012226 A1 * | 1/2004 | Morrison et al. .......... 296/146.5 |
| 2004/0187263 A1 | 9/2004 | Hoffman |
| 2005/0285429 A1 | 12/2005 | Valois |
| 2007/0039245 A1 * | 2/2007 | Buchta et al. ................... 49/502 |
| 2009/0322117 A1 * | 12/2009 | Arvidsson et al. ......... 296/146.6 |

\* cited by examiner

SIDE PROTECTION DEVICE FOR A MOTOR VEHICLE AND ASSOCIATED MOTOR VEHICLE

TECHNICAL FIELD OF THE INVENTION

The invention relates to a side protection device for a motor vehicle comprising a body and an opening for at least one passenger to access the vehicle, the device comprising:
- a side protection element, capable of being shifted from a closed position, in which it blocks off the opening at least partly, to an open position,
- an attachment device, capable of assuring the attachment between the body of the vehicle and the side protection element,
- a hinge and balancing system, disposed at a first end of the side protection element,
- a latch element, intended to cooperate with a lock element attached to the body of the vehicle and disposed at an opposite end of the side protection element, and
- at least one guide means, integral with the side protection element and intended to cooperate with at least one centering means fixed to the body, in such a way as to guide closing of the side protection element.

The invention also relates to a motor vehicle provided with such a side protection device.

PRIOR ART

In a traditional vehicle, such as a motor vehicle, a closing means or side protection device is usually referred to as a door or hatch. In this case, the door may support accessories projecting from the coachwork, such as rear-view mirrors and/or deflectors.

In particular, there are known doors that open toward the front or rear of a vehicle around a substantially vertical axis. There are also known doors, referred to as butterfly doors, that open upward around a substantially horizontal axis. These doors have the disadvantage in particular of necessitating a relatively large clearance space around the vehicle in order to be maneuvered.

There are also known sliding doors, but these necessitate a large device with slideways along the vehicle.

In order to facilitate travel and parking in cities, certain motor vehicles have a compact structure making it possible to limit their space requirement on the ground. For such vehicles, the optimization of the cost and weight of the vehicle as well as control of the width are motivations against equipping them with doors usually designed for traditional vehicles. These doors actually prove to be heavy, complex and costly. In addition, certain functionalities, such as peripheral sealing or safety, are not necessarily indispensable for vehicles of this type.

Furthermore, the Applicant has already proposed new solutions for doors opening in gullwing style, especially as described in EP 0493225. Nevertheless, such doors prove to be difficult to transpose and employ, depending on the type of vehicle considered, especially in the case of a vehicle of very small size.

Thus, in order to be able to continue to offer the occupants protection against inclement weather and/or side impacts, and possibly to prevent break-ins, it is necessary to search for new solutions, especially since the advent of new urban vehicles of small size compared with traditional vehicles.

OBJECT OF THE INVENTION

The objective of the invention is to overcome all of the aforesaid disadvantages, and its object is the construction of a side protection device for a motor vehicle that does not present the same constraints as a traditional door and makes it possible to provide optimum protection for the occupants of the vehicle.

The object of the invention is characterized more particularly by the fact that the side protection element has an internal skeleton comprising a structural module of plastic and a stiffener tube of metal, the said structural module being provided with a multi-ribbed first portion, capable of receiving the stiffener tube, and a second open portion, capable of defining a frame for a translucent panel.

Such a side protection device thus makes it possible to meet minimum conditions for protection of the occupants, with a closing-means system that is simple to manipulate and easy to integrate on the side of a vehicle, and a side protection device that is both lightweight and sufficiently rigid to meet the different safety standards. Similarly, such a side protection device, even if it does not cover the entire opening, makes it possible to reinforce the feeling of safety for the passengers, both while in motion and when stopped. It also offers extra aerodynamic protection and protection against inclement weather.

Other advantages and characteristics of the invention may be considered individually or in combination:
- The said hinge and balancing system may comprise:
  - a shaft of rotation, oriented substantially perpendicular to the side protection element and attached to the body and to the side protection element via fixation plates, and
  - a damping means, attached to the side protection element and to the body, so as to permit opening of the side protection element at an angle of rotation on the order of 120°.
- The side protection device may be provided with a second guide means, integral with the side protection element and intended to cooperate with a second centering means fixed to the body, so as to optimize the guidance of closing of the side protection element.
- Each centering means may be provided with a peg fixed to the body and projecting from the body substantially toward the opening, each peg being equipped with an overmolding of polymer material.
- Each guide means may be provided with a channel-section member, fixed projecting from the side protection element, the channel-section member having two branches forming a space intended to cooperate with the associated centering means.
- Each channel-section member may be provided with a first substantially plane portion coming to be fixed on the said structural module of the skeleton of the side protection element.
- The said plane portion of each channel-section member may be fixed by means of two screws.
- The ends of the branches of each channel-section member may be chamfered toward the interior of the said space, so as to optimize the guidance of the associated centering means.
- Since the stiffener tube extends along the side protection element, the stiffener tube may be equipped at its two opposite ends with the said hinge and balancing system and with the said latch element.

Another object of the invention is the construction of a motor vehicle, especially of the small urban vehicle type, the characteristics of which are optimum in terms of safety of the passengers.

This object of the invention is characterized more particularly in that the motor vehicle is provided with such a side protection device.

SUMMARY DESCRIPTION OF THE DRAWINGS

Other advantages and characteristics will become more clearly apparent from the description to follow of particular embodiments of the invention, provided by way of non-limitative examples and represented in the attached drawings, wherein.

Figure 3:
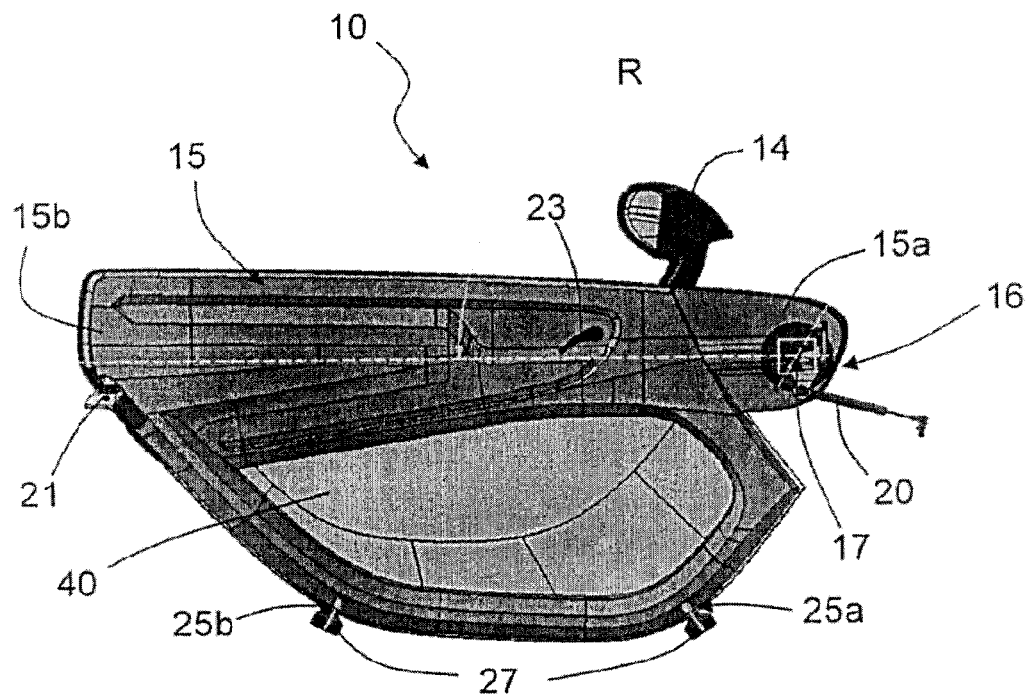
FIG. 3 represents a side view of the side protection device according to FIGS. 1 and 2, represented without the associated motor vehicle.
Figure 4:
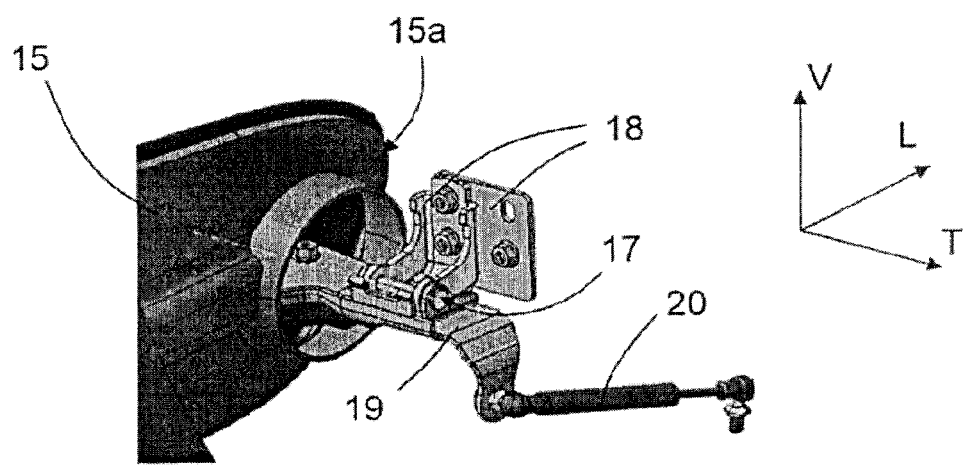
FIG. 4 represents an enlarged perspective view of a hinge and balancing system of the side protection device according to FIGS. 1 to 3.
Figure 5:
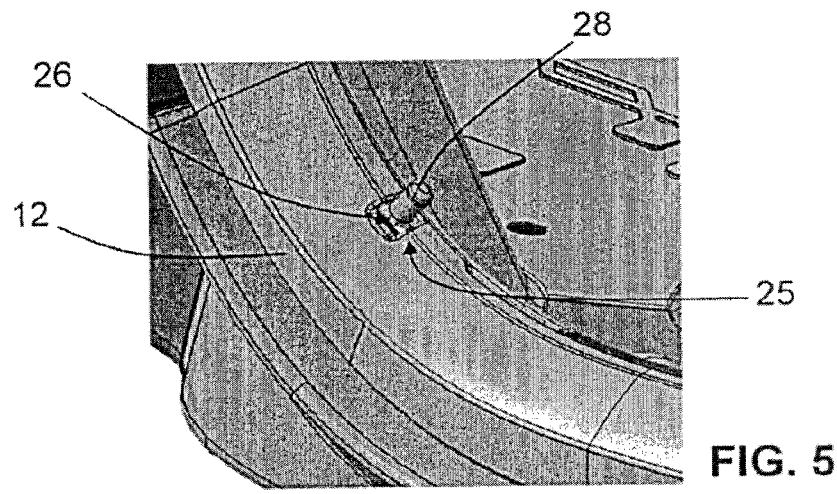
Figure 6:
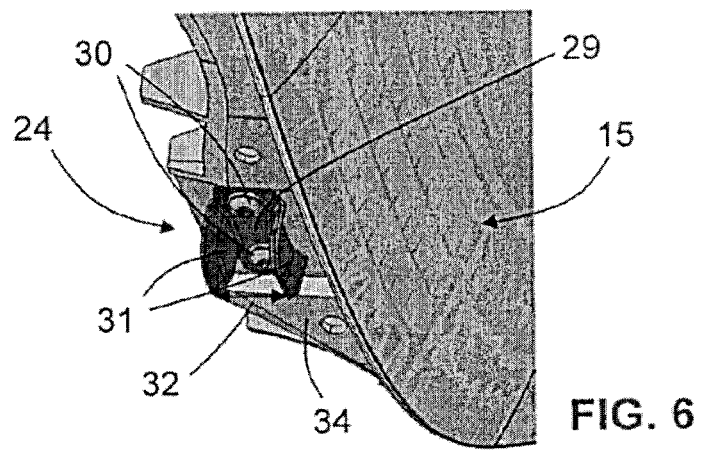
Figure 7:
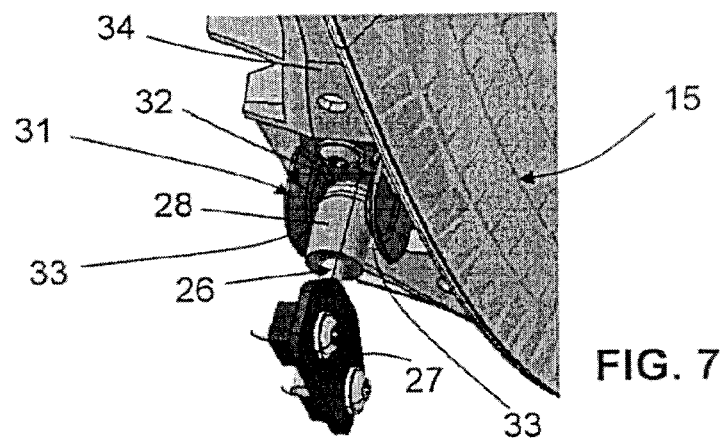

FIGS. 5 to 7 each represent an enlarged perspective view of a portion of the side protection device according to FIGS. 1 to 4.

Figure 8:
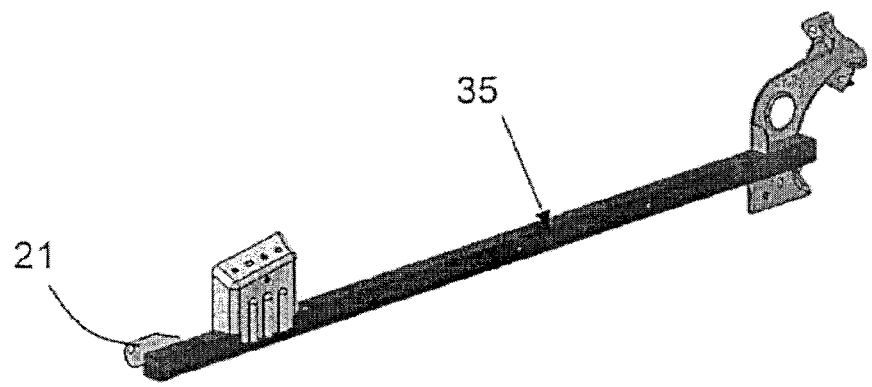
Figure 9:
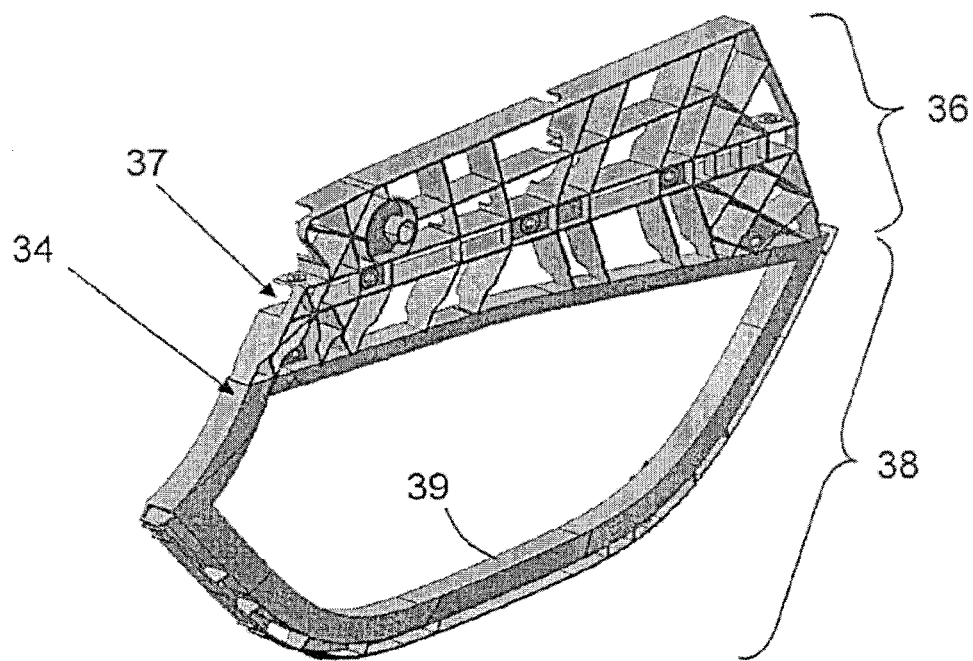

FIGS. 8 and 9 each represent a perspective view of a constituent element of the side protection device according to FIGS. 1 to 7.

DESCRIPTION OF PARTICULAR EMBODIMENTS

In the description hereinafter, identical or analogous elements will be denoted by the same codes and reference numbers. The terms front and rear are defined relative to the longitudinal direction of the vehicle. In the description hereinafter, we shall assume, without being limited thereto, a longitudinal, vertical and transversal orientation indicated by the coordinate system L, V, T represented in FIG. 1.

Figure 1:
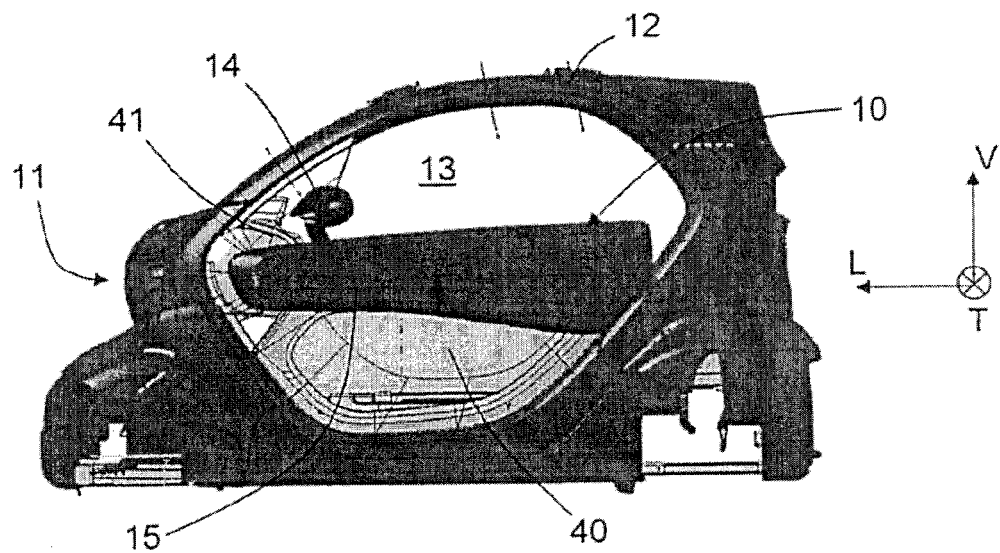
FIG. 1 represents a side view of part of a motor vehicle according to the invention equipped with a particular embodiment of a side protection device according to the invention in a first closed position.
Figure 2:
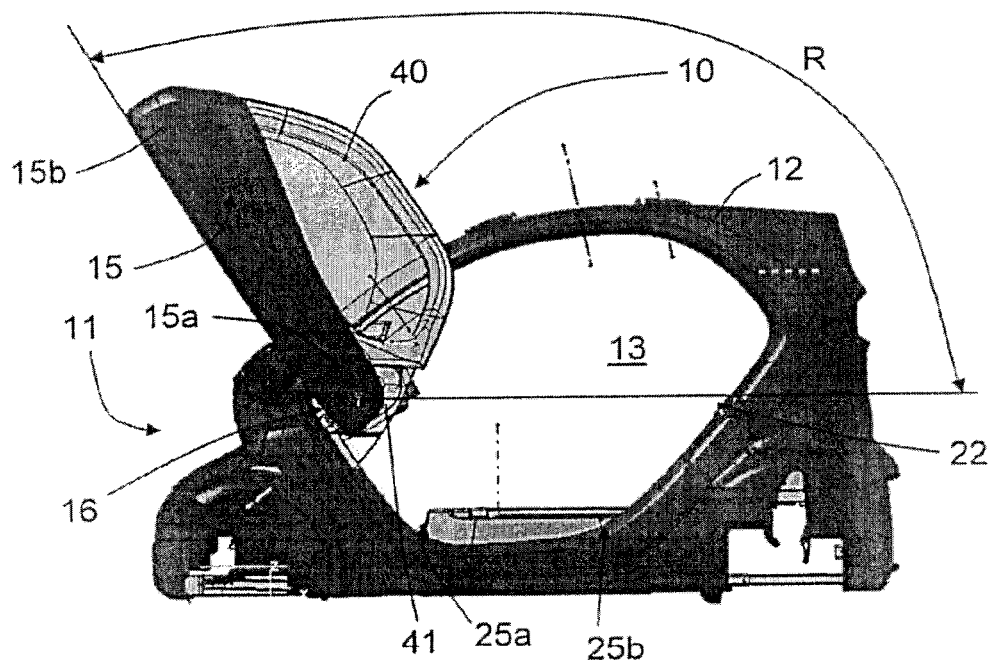
FIG. 2 represents a side view of the motor vehicle according to FIG. 1, the side protection device being in a second open position.

Referring to FIGS. 1 to 9, side protection device 10 according to the invention is intended as equipment for a motor vehicle 11. More particularly, FIGS. 1 and 2 represent the left side of a vehicle 11 provided with more than two wheels (not represented), preferably four wheels, with seats in tandem, preferably one driver seat and one or two rear passenger seats, very similar to the arrangement of seats of a two-wheeled vehicle.

In FIGS. 1 and 2, vehicle 11 comprises a body 12 with an opening 13 for at least one passenger to access the interior of the vehicle. In the example represented in FIGS. 1 and 2, a rear-view mirror 14, integral with side protection device 10, projects from the side of vehicle 11. Opening 13 is blocked off, preferably partly by a side protection element 15 of device 10, not only making it possible to prevent the occupants from falling out of the vehicle but also making it possible to protect the occupant or occupants from side impact on the vehicle or more simply from any object hurled from the outside or liquid coming from outside or from the road.

In the description hereinafter, side protection element 15 will be understood as any element of the closure means or fascia or structure type that at least partly blocks opening 13 formed in body 12 of vehicle 11 and that permits side protection of the occupant or occupants in its first closed position (FIG. 1).

In FIG. 1, side protection element 15 is in a first closed position, substantially horizontal along longitudinal axis L of vehicle 11. In FIG. 2, side protection element 15 is in a second position opened to the maximum, at an angle of rotation R on the order of 120°, substantially around transversal axis T.

To achieve this specific open position in gullwing style at the angle of rotation R on the order of 120° (FIG. 2), protection device 10 is provided with a hinge and balancing system 16, disposed at a first end 15a of side protection element 15. More particularly, as represented in FIGS. 3 and 4, hinge and balancing system 16 has a shaft of rotation 17 of side protection element 15 substantially parallel to transversal axis T of vehicle 11 (FIG. 4) and oriented substantially perpendicular to side protection element 15. Shaft of rotation 17 is in particular attached to body 11 via fixation plates 18 and is attached to side protection element 15 by an attachment or fixation plate 19, disposed at first end 15a of side protection element 15 and connected to body 11 via a damping means 20, for example of the pneumatic cylinder type (FIG. 4).

In this way, such a hinge and balancing system 16, together with shaft of rotation 17 and pneumatic cylinder 20, makes it possible to achieve the characteristic open position in gullwing style at the angle of rotation R on the order of 120°, permitting optimum access of occupants to the interior of the vehicle and making it easier to grip side protection device 10, because it is so high, for the purpose of closing it (FIG. 1).

Furthermore, hinge and balancing system 16 is advantageously disposed in firewall 41 of vehicle 11 (FIGS. 1 and 2), so as to be hidden as much as possible from the sight of the occupants, in particular to impart a better effect of design and interior finishing of the vehicle.

Furthermore, as represented more particularly in FIGS. 2 and 3, protection device 10 according to the invention is also provided with a latch element 21 (FIG. 3), disposed at the end 15b of side protection element 15, opposite end 15a equipped with hinge and balancing system 16 and intended to cooperate with a lock element 22 disposed on body 12 of vehicle 11 (FIG. 2). The system comprising latch 21 and lock 22 is actuated, for example, by way of an interior opening control 23, disposed in the interior of vehicle 11 on side protection element 15 (FIG. 3).

Furthermore, as represented more particularly in FIGS. 2, 3 and 5 to 7, protection device 10 according to the invention is provided with at least one guide means 24, preferably two guide means 24a, 24b, integral with side protection element 15 and intended to cooperate with two associated centering means 25a, 25b, fixed on body 12 of the vehicle (FIG. 2). The purpose of such guide means 24 and such centering means 25 is to optimize the guidance of closing of side protection element 15.

In FIGS. 5 and 7, each centering means 25 is provided with a peg 26 or rod, fixed to body 12, for example by way of a plate 27, disposed in the interior of body 12, so that only peg 26 projects from body 12, substantially in the plane of opening 13 of vehicle 11 (FIGS. 2 and 5). In FIGS. 3 and 7, plate 27 associated with each peg 26 is represented as visible without body 12 for reasons of clarity.

Similarly, each peg 26 is equipped at its free end with an overmolding 28, preferably of elastomeric material, suitable not only for facilitating the guidance but also for preventing any injury to an occupant getting out of vehicle 11 and catching on peg 26. Thus, as represented more particularly in FIG. 5, only overmolding 28 of each centering means 25 projects from body 12, to cooperate with the associated guide means 24, attached to side protection element 15 as described hereinafter.

In FIGS. 6 and 7, each guide means 24 is preferably a channel-section member, provided with a first substantially plane portion 29 coming to be fixed, for example, on a structural module 34 of side protection element 15, by means, for example, of two screws 30 or rivets. The channel-section member is also provided with two branches 31 forming a space 32 between them, capable of cooperating with associated centering means 25. The two branches 31 project from side protection element 15 substantially vertically toward the bottom of vehicle 11, more particularly in the direction of body 12, when protection device 10 is in its closed position (FIG. 1).

Furthermore, as represented more particularly in FIG. 7, the two branches 31 of the channel-section member are provided with chamfered ends 33, capable of optimizing the guidance of associated peg 26, more particularly of overmolding 28, during its shift into space 32 formed between branches 31 of the channel-section member.

The closing and the guidance/centering of side protection element 15 will now be described in more detail with reference to FIGS. 1 to 3 and FIGS. 5 to 7. As represented in FIGS. 2 and 3, the two centering means 25a, 25b are distributed over the rim of opening 13 of body 12, preferably substantially facing ends 15a and 15b of side protection element 15, so as to optimize the guidance of side protection element 15. During closing of side protection element 15, in order to shift from its position represented in FIG. 2 to its position represented in FIG. 1, branches 31 of guide means 24a become positioned on both sides of overmolding 28 of peg 26 of associated centering means 25a (FIGS. 2 and 3), by virtue of chamfered ends 33 and space 32 formed by branches 31 of guide means 24a. Then, toward the end of closing, guide means 24b comes to cooperate with the other peg 26 of centering means 25b, positioned substantially facing end 15b of side protection element 15 on the side of latch 21/lock 22, so as to center side protection element 15 accurately and to finish the guidance and closing of side protection element 15.

In FIGS. 8 and 9, the particular embodiment of side protection element 15 of assembly device 10 according to the invention is advantageously provided with an internal skeleton comprising a structural module 34, preferably of plastic or thermoplastic, and a stiffener tube, preferably of metal. Structural module 34 is made of plastic, for example of polymer material filled with glass fibers, for example in a proportion of 35%, for reasons of weight and manufacturing costs, while stiffener tube 35 is of metal, for example of steel, for questions of safety and of reinforcement of side protection element 15.

In FIG. 8, stiffener tube 35 of side protection element 15 has preferably a square cross section and preferably extends along the entire length of side protection element 15 (not represented in FIG. 8 for reasons of clarity), so as to be equipped at its ends with latch system 21 and with hinge and balancing system 16 (not represented in FIG. 8 for reasons of clarity).

In FIG. 9, structural module 34 of side protection element 15 (not represented in FIG. 9 for reasons of clarity) comprises a first multi-ribbed portion 36, which defines a seat 37 for stiffener tube 35, and a second open portion 38, defining a frame 39 for a translucent panel 40 with which side protection element 15 can be equipped (FIGS. 1 to 3).

Such a side protection element 15 therefore has the advantage of being relatively lightweight, by virtue of the skeleton of plastic, while offering good resistance to side impacts by virtue of the stiffener tube.

Regardless of the embodiment of side protection device 10 as described hereinabove, it has in particular the following advantages:
- side protection element 15 makes it possible to address all of the specific constraints associated with this type of vehicle, namely the specific kinematics of the side protection element, the constraints due to the design of the vehicle, the constraints due to the already existing environment, the different technical specifications concerning endurance, stiffness, torsion, etc.;
- the side protection device is both lightweight and very rigid, by virtue of structural module 34 and of stiffener tube 35, side protection element 15 has a single hinge, which makes it simple to manipulate and to integrate in the body of the vehicle.

The invention is not limited to the different embodiments described hereinabove. In particular, the protection device may comprise any type of hinge and balancing system, provided it permits these characteristic kinematics with an angle of rotation on the order of 120°, any type of latch and lock elements, provided they permit interlocking of the side protection element with the vehicle, and any type of guide and centering means, provided they permit optimization of the guidance of closing of the side protection element.

Furthermore, the side protection element may be provided with any type of skeleton, provided it has a structural module of plastic and a stiffener tube of metal, suitable for meeting the double requirement of light weight and of safety.

Such a side protection device 10 is therefore applicable to any type of motor vehicle 11, especially small urban vehicles, of the traditional or electric type, of the type with two or three seats in tandem.

The invention claimed is:

1. A side protection device for a motor vehicle including a body and an opening for at least one passenger to access the vehicle, the side protection device comprising:
   a side protection element, configured to be shifted from a closed position, in which it blocks off the opening at least partly, to an open position;
   an attachment device, configured to assure attachment between the body of the vehicle and the side protection element;
   a hinge and balancing system, disposed at a first end of the side protection element;
   a latch element, configured to cooperate with a lock element attached to the body of the vehicle and disposed at an opposite end of the side protection element; and
   at least a first guide means, extending from a bottom edge of the side protection element and toward a bottom of the vehicle when the side protection element is in the closed position, the first guide means being configured to cooperate with a first centering means fixed to the body, so as to guide closing of the side protection element,
   wherein the side protection element includes an internal skeleton including a structural module of plastic and a stiffener tube of metal, the structural module including a multi-ribbed first portion, configured to receive the stiffener tube, and a second open portion, configured to define a frame for a translucent panel.

2. A protection device according to claim 1, wherein the hinge and balancing system includes:
   a shaft of rotation, oriented substantially perpendicular to the side protection element and attached to the body and to the side protection element via fixation plates; and a damping means, attached to the side protection element and to the body, so as to permit opening of the side protection element at an angle of rotation on an order of 120°.

3. A protection device according to claim 2, wherein the shaft of rotation is oriented substantially parallel to a transverse axis of the vehicle.

4. A protection device according to claim 2, wherein the first centering means includes a peg fixed to the body and projecting from the body substantially toward the opening, the peg including an overmolding of polymer material.

5. A protection device according to claim 4, wherein the first guide means includes a channel-section member, fixed to and projecting from the side protection element, the channel-section member including two branches forming a space between the two branches and configured to cooperate with the first centering means such that, when the side protection element is in the closed position, the peg is located between the two branches of the first guide means.

6. A protection device according to claim 5, wherein the channel-section member includes a first substantially plane portion configured to be fixed on the structural module of the skeleton of the side protection element.

7. A protection device according to claim 6, wherein the plane portion of the channel-section member is fixed by two screws.

8. A protection device according to claim 7, wherein the ends of the branches of the channel-section member are chamfered toward an interior of the space, so as to optimize guidance of the first centering means.

9. A protection device according to claim 1, further comprising a second guide means, integral with the side protection element and configured to cooperate with a second centering means fixed to the body, so as to optimize guidance of closing of the side protection element.

10. A protection device according to claim 1, wherein the first centering means includes a peg fixed to the body and projecting from the body substantially toward the opening, the peg including an overmolding of polymer material.

11. A protection device according to claim 10, wherein the first guide means includes a channel-section member, fixed to and projecting from the side protection element, the channel-section member including two branches forming a space between the two branches and configured to cooperate with the first centering means such that, when the side protection element is in the closed position, the peg is located between the two branches of the first guide means.

12. A protection device according to claim 11, wherein the channel-section member includes a first substantially plane portion configured to be fixed on the structural module of the skeleton of the side protection element.

13. A protection device according to claim 12, wherein the plane portion of the channel-section member is fixed by two screws.

14. A protection device according to claim 13, wherein the ends of the branches of the channel-section member are chamfered toward an interior of the space, so as to optimize guidance of the first centering means.

15. A protection device according to claim 1, wherein the stiffener tube extends along the side protection element, and the stiffener tube includes two opposite ends with the hinge and balancing system and with the latch element.

16. A motor vehicle, comprising:
   a body including an opening for at least one passenger to access the vehicle; and
   the side protection device according to claim 1 attached to the body.

\* \* \* \* \*